(12) United States Patent
Gross et al.

(10) Patent No.: US 11,823,032 B2
(45) Date of Patent: Nov. 21, 2023

(54) TUNING LOCAL CONDUCTANCES OF MOLECULAR NETWORKS: APPLICATIONS TO ARTIFICIAL NEURAL NETWORKS

(71) Applicant: International Business Machines Corporation, Armonk, NY (US)

(72) Inventors: Leo Gross, Adliswil (CH); Shadi Fatayer, Adliswil (CH); Florian Albrecht, Adliswil (CH); Fabian Schulz, Zurich (CH); Katharina Kaiser, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 16/254,848

(22) Filed: Jan. 23, 2019

(65) Prior Publication Data
US 2020/0234104 A1    Jul. 23, 2020

(51) Int. Cl.
*G06N 3/06*    (2006.01)
*G01Q 80/00*    (2010.01)
*G06N 3/04*    (2023.01)

(52) U.S. Cl.
CPC ............ *G06N 3/061* (2013.01); *G01Q 80/00* (2013.01); *G06N 3/04* (2013.01)

(58) Field of Classification Search
CPC ........... G06N 3/04; G06N 3/061; G01Q 80/00
See application file for complete search history.

(56) References Cited

U.S. PATENT DOCUMENTS

| | | | |
|---|---|---|---|
| 7,359,888 B2 | 4/2008 | Snider | |
| 7,398,259 B2 | 7/2008 | Nugent | |
| 2005/0156157 A1 | 7/2005 | Parsons et al. | |
| 2007/0090344 A1* | 4/2007 | Williams | ............ H01L 29/0673 257/40 |
| 2007/0128744 A1 | 6/2007 | Tour et al. | |

FOREIGN PATENT DOCUMENTS

WO    02/09117 A1    1/2002

OTHER PUBLICATIONS

Huang, Wei Tao, et al. "Molecular neuron: From sensing to logic computation, information encoding, and encryption." Sensors and Actuators B: Chemical 239 (2017): 704-710. (Year: 2017).*

(Continued)

*Primary Examiner* — Benjamin P Geib
(74) *Attorney, Agent, or Firm* — Harrington & Smith

(57) ABSTRACT

A method for tuning the conductance of a molecular network includes a network of covalently bound molecular units, which are molecular entities assembled so as to form a network that can typically be compared to a finite, imperfect 2D crystal. Each of the molecular entities includes: a branching junction; M branches (M≥3) branching from said branching junction, where each of the M branches comprises an aliphatic group; and M linkers, each terminating a respective one of the M branches. Each of the M linkers is covalently bound to a linker of another molecular entity of the network. The method involves tuning the electrical conductance of molecular entities of a subset of the molecular entities of the network, in one or several (e.g., parallel or successive) steps.

19 Claims, 8 Drawing Sheets

(56) References Cited

OTHER PUBLICATIONS

Bandyopadhyay, Anirban, Satyajit Sahu, and Daisuke Fujita. "Smallest artificial molecular neural-net for collective and emergent information processing." Applied physics letters 95.11 (2009): 113702. (Year: 2009).*
Taylor, D. M., H. Fukushima, and H. Morgan. "Molecular-scale neural nets: an approach to the self-assembly of molecular networks." Supramolecular Science 2.2 (1995): 75-87. (Year: 1995).*
Basagni, Andrea, et al., "Tunable Band Alignment with Unperturbed Carrier Mobility of On-Surface Synthesized Organic Semiconducting Wires", ACS Nano, ACS Publications, Oct. 2018, pp. 2644-2651.

* cited by examiner

TUNING LOCAL CONDUCTANCES OF MOLECULAR NETWORKS: APPLICATIONS TO ARTIFICIAL NEURAL NETWORKS

BACKGROUND

The invention generally relates to techniques for synthetizing molecular networks and altering properties of such molecular networks. In particular, it is directed to methods for tuning the local electrical conductances of molecular networks, e.g., to implement artificial neural networks. The local electrical conductance may notably be altered using techniques related to scanning probe lithography and scanning probe microscopy.

Scanning probe lithography (SPL) encompasses various nanolithographic techniques to pattern materials with scanning probes. Closely related, scanning probe microscopy (SPM) was born with the invention of the scanning tunneling and the atomic force microscope. SPM aims at forming images of sample surfaces using a physical probe. Scanning probe microscopy techniques rely on scanning such a probe, e.g. including a sharp tip, just above or in contact with a sample surface whilst monitoring interactions between the probe and the surface, whereby an image of the sample surface can be obtained. Typically, a raster scan of the sample is carried out and the probe-surface interaction is recorded as a function of position. Data are thus typically obtained as a two-dimensional grid of data points. The resolution achieved varies with the actual technique used: atomic resolution can be achieved in some cases. Typically, either piezoelectric actuators or electrostatic actuation are used to execute precise motions of the probe. The position of the probe tip with respect to the surface must be accurately controlled (e.g., to within about 0.1 angstroms); either the sample or the probe tip can be moved. The tip is usually very sharp, ideally terminated by a single atom or molecule at its closest point to the surface.

Two main types of SPM are the scanning tunneling microscopy (STM) and the atomic force microscopy (AFM). Several variants are known, such as the so-called noncontact AFM (also called dynamic AFM), Kelvin probe force microscopy (or KPFM, also known as "surface potential microscopy"), and the closely related "electrostatic force microscopy" (EFM). The KPFM and EFM techniques are based on noncontact AFM.

In a different technological field, machine learning concerns a set of techniques to allow computerized systems (or other hardware devices) to learn from input data. Machine learning often relies on artificial neural networks (ANNs), which are computational models inspired by biological neural networks in human or animal brains. Such systems progressively and autonomously learn tasks by means of examples; they have successfully been applied to speech recognition, text processing and computer vision, amongst other examples.

An ANN comprises a set of connected entities or nodes, which compare to biological neurons in animal brains and are therefore called artificial neurons. Signals are transmitted along connections (also called edges) between artificial neurons, similar to synapses. That is, an artificial neuron that receives a signal processes it and then signals connected neurons. The signals conveyed along such connections typically are analog (real numbers) and outputs of the artificial neurons are computed due to a non-linear function of the sum of its inputs.

Connection weights (also called synaptic weights) are normally associated with the connections and nodes; such weights adjust as learning proceeds. Each neuron may have several inputs and a connection weight is attributed to each input (the weight of that specific connection). In software implementations, such connection weights are learned by the training algorithm during a training phase and thereby updated. The learning process is iterative: data cases are presented to the network, typically one at a time, and the weights associated with the input values are adjusted at each time step.

Many types of neural networks are known, starting with feedforward neural networks, such as multilayer perceptrons, deep neural networks and convolutional neural networks. The vast majority of implementation of neural networks concerns software implementation. Still, ANNs may also be implemented in hardware, e.g., as a resistive processing unit (resistive crosspoint device) or an optical neuromorphic system.

The following references form part of the background art:
Schuler, B.; Zhang, Y.; Collazos, S.; Fatayer, S.; Meyer, G.; Pérez, D.; Guitián, E.; Harper, M. R.; Kushnerick, J. D.; Peña, D. & Gross, L. Characterizing aliphatic moieties in hydrocarbons with atomic force microscopy. Chem. Sci., 2017, 8, 2315-2320 ("Schuler, Chem. Sci. 2017");
Gross, L.; Mohn, F.; Liljeroth, P.; Repp, J.; Giessibl, F. J. & Meyer, G. Measuring the Charge State of an Adatom with Noncontact Atomic Force Microscopy. Science, 2009, 324, 1428-1431 ("Gross, Science 2009");
Steurer, W.; Fatayer, S.; Gross, L. & Meyer, G. Probe-based measurement of lateral single-electron transfer between individual molecules. Nat. Comm., 2015, 6, 8353 ("Steurer, Nat. Comm. 2015");
Liljeroth, P.; Repp, J. & Meyer, G. Current-Induced Hydrogen Tautomerization and Conductance Switching of Naphthalocyanine Molecules. Science, 2007, 317, 1203-1206 ("Liljeroth, Science 2007");
Leoni, T.; Guillermet, O.; Walch, H.; Langlais, V.; Scheuermann, A.; Bonvoisin, J. & Gauthier, S. Controlling the Charge State of a Single Redox Molecular Switch. Phys. Rev. Lett., 2011, 106, 216103 ("Leoni, Phys. Rev. Lett. 2010");
Schuler, B.; Fatayer, S.; Mohn, F.; Moll, N.; Pavliček, N.; Meyer, G.; Peña, D. & Gross, L. Reversible Bergman cyclization by atomic manipulation. Nat. Chem., Nature Publishing Group, 2016, 8, 220-224 ("Schuler, Nat. Chem. 2016"); and
Mohn, F.; Repp, J.; Gross, L.; Meyer, G.; Dyer, M. S. & Persson, M. Reversible Bond Formation in a Gold-Atom-Organic-Molecule Complex as a Molecular Switch. Phys. Rev. Lett., 2010, 105, 266102 ("Mohn, Phys. Rev. Lett. 2010"): and
Gross, L., et al. "Contacting self-ordered molecular wires by nanostencil lithography." Journal of Vacuum Science & Technology B, Nanotechnology and Microelectronics: Materials, Processing, Measurement, and Phenomena 28.3 (2010): C4D34-C4D39. ("Gross, J. Vac. Sci. Technol. B, 2010"); and
Kalff, F. E., et al. "A kilobyte rewritable atomic memory." Nature nanotechnology 11.11 (2016): 926-929. ("Kalff, Nat. Nano. 2016").

SUMMARY

According to a first aspect, one example of a method for tuning the conductance of a molecular network uses a network of covalently bound molecular units, which are molecular entities assembled so as to form a network that can typically be compared to a finite, imperfect 2D crystal.

Each of the molecular entities comprises: a branching junction; M branches (M≥3) branching from the branching junction, where each of the M branches comprises an aliphatic group; and M linkers, each terminating a respective one of the M branches. Each of the M linkers is covalently bound to a linker of another molecular entity of the network. The method involves tuning the electrical conductance of molecular entities of a subset of the molecular entities of the network, in one or several (e.g., parallel or successive) steps. Such steps are preferably carried out via one or more nanoscale probes, although other media can possibly be relied on. The electrical conductance of such molecular entities may notably be altered by atom manipulations, using heating techniques, and/or by passing a current through branches of the molecular entities, via one or more nanoscale probes. The electrical conductance of the molecular entities may for instance be tuned so as for molecular entities of the subset to have different electrical conductances. In particular, the electrical conductance may possibly be altered by changing hybridization states of carbon atoms of branches of the molecular entities. The versatility of the present tuning schemes notably allows the molecular network to be trained as a neural network hardware device.

In some example embodiments, the branching junction of each of the molecular entities may comprise a first aromatic ring, while each of the M linkers may comprise a second aromatic ring, the latter covalently bound to an aromatic ring of a linker of another molecular entity of the network. In variants, each linker may possibly comprise one or more alkyne groups.

In some example applications of the present methods, the molecular network is meant to implement an artificial neural network. E.g., the electrical conductance of the molecular entities may be altered so as to train the molecular network with respect of a set of feature vectors. Thus, in a subsequent stage, the trained network may for instance be used for inference purposes, e.g., by reading characteristics of electrical signals (currents and/or voltage biases) applied to the trained network, where such signals are generated based on a second set of feature vectors, for inference purposes.

The present molecular networks are advantageously synthetized by on-surface chemistry. E.g., precursor molecules may first be provided, which have characteristics similar to molecular entities such as described above. I.e., the precursor molecules comprise, each, a branching junction with a first aromatic ring, M branches branching from the branching junction, where M≥3, each of the M branches comprising an acyclic alkyl group; and M linkers, each terminating a respective one of the M branches and comprising a second aromatic ring covalently bound, on the one hand, to the respective one of the M branches, and, on the other hand, to a halogen atom X. The network may thus be synthetized by forming bonds between linkers of pairs of the precursor molecules provided, by dehalogenation. The halogen atom X may for example be a bromine atom Br, in which case bonds between linkers are formed by debromination. In variants, the linkers may be bound to an alkyne group, instead of a halogen atom. In such cases, the network may be synthetized by forming bonds between linkers of pairs of precursor molecules, by or dehydrogenation.

According to another aspect, another example is embodied as an information processing apparatus. This apparatus comprises a support and a network of covalently bound molecular entities such as described above, wherein the molecular network is arranged on the support. The apparatus further comprises a tuning system having one or more contacting elements, which are configured in the tuning system so as to contact molecular entities of the network, for the tuning system to tune the electrical conductance of molecular entities of a subset of the molecular entities of the network, in operation.

The contacting elements may notably comprise one or more nanoscale probes. In addition, the tuning system may further include a motion system to move the nanoscale probes and thereby tune the electrical conductance of the molecular entities, in operation.

Moreover, the above apparatus may possibly comprise a set of electrical contacts arranged on a surface of the support, onto which the network of covalently bound molecular entities extends. Each of the contacting elements contacts one or more of the molecular entities of the molecular network. Such electrical contacts may notably be arranged at a periphery of the support, so as to contact edge molecular entities of the network.

Apparatuses and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Technical features depicted in FIGS. 1 and 2 are not to scale. Similar or functionally similar elements in the figures have been allocated the same numeral references, unless otherwise indicated.

DETAILED DESCRIPTION OF EMBODIMENTS OF THE INVENTION

An example aspect is first described, which concerns a method for tuning the conductance of a molecular network.

This method is described in reference to FIGS. 3-6; it can notably be implemented in an apparatus such as depicted in FIGS. 1-2, which is a processing apparatus having various components, such components including a support onto which extends a network of molecular entities. The views schematically shown in FIGS. 1 and 2 illustrate the operation of nanoscale probes to locally modify the geometry or chemical structure and thus the electrical conductance of the molecular network.

Figure 4A:
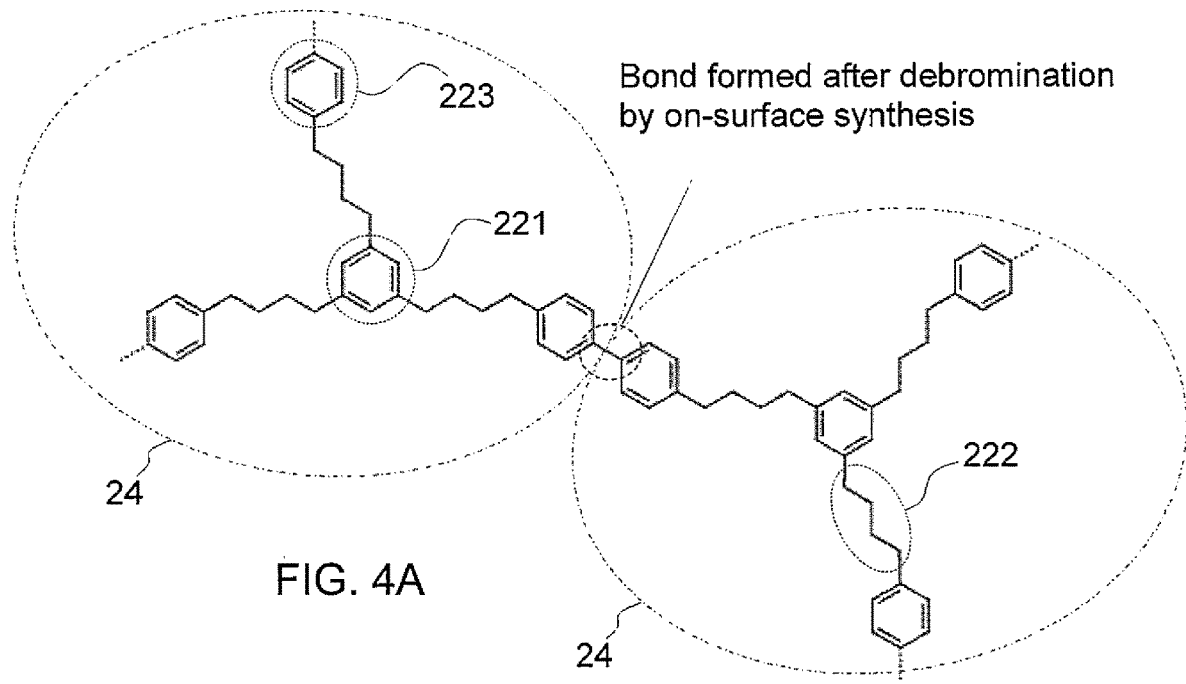
FIGS. 4A-4C illustrate the formation of bonds between molecules upon debromination and carbon-carbon bond formation by on-surface synthesis, so as to achieve a molecular network (FIG. 4C), as involved in embodiments.
Figure 4B:
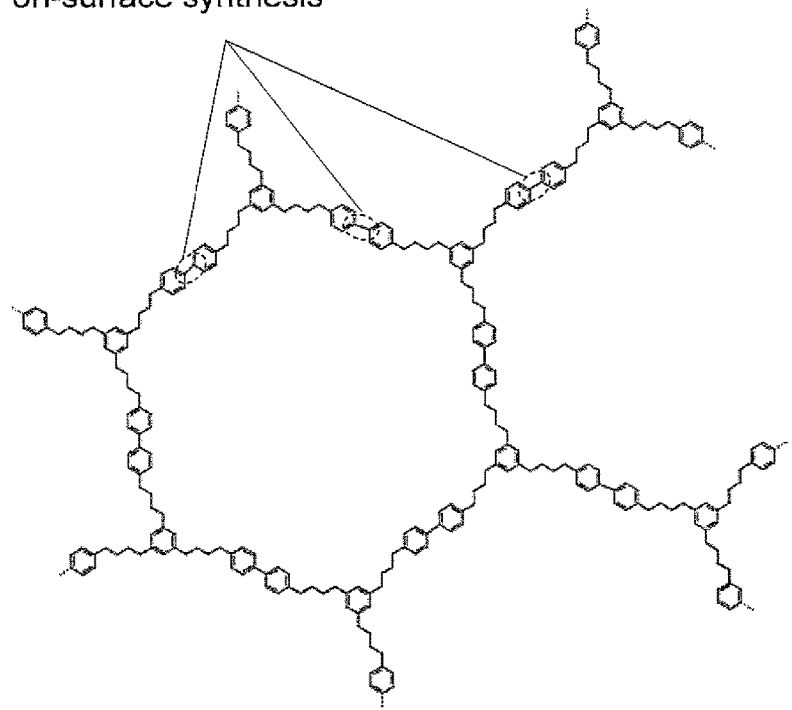
Figure 4C:
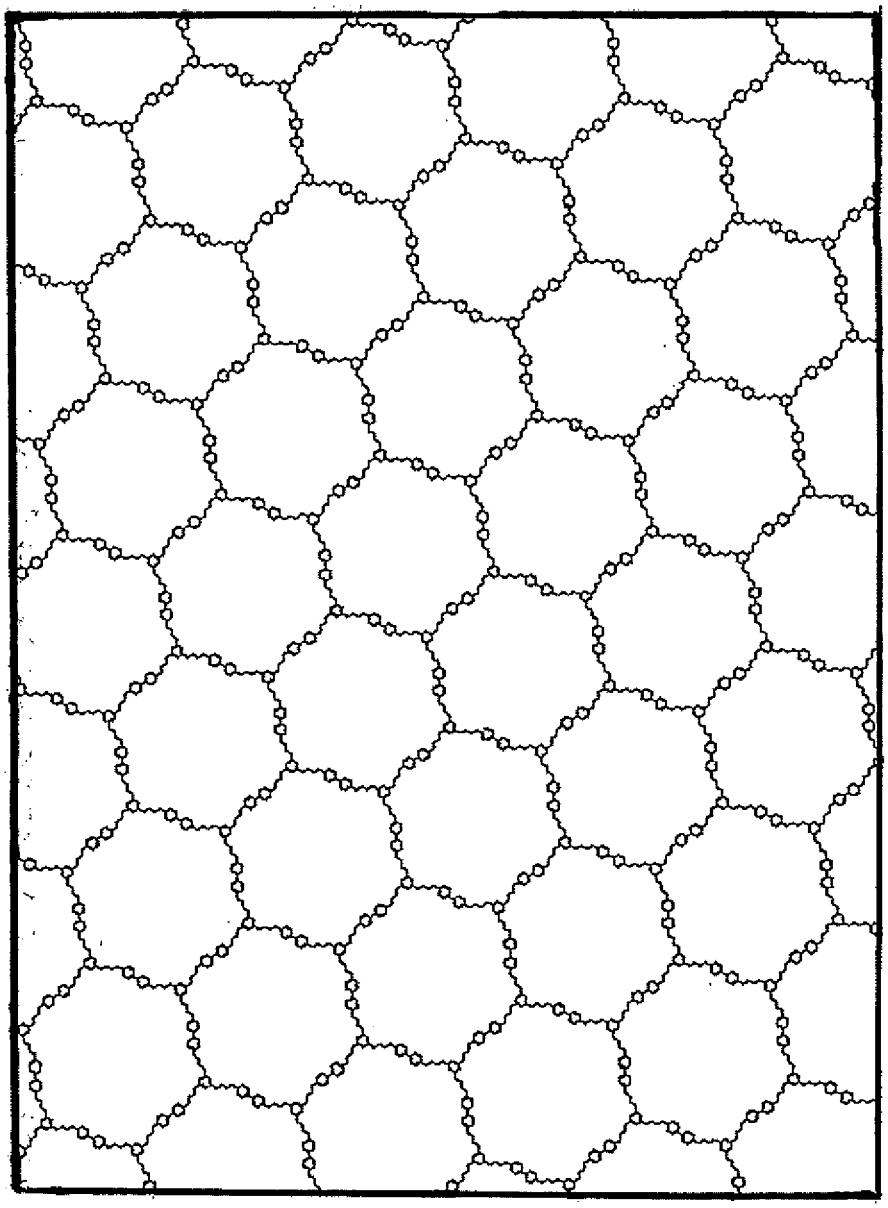

The present method and its variants (collectively referred to as "the present methods") revolve around tuning (i.e., altering) the local electrical conductance of a network 26 of covalently bound molecular entities 24, such as depicted in FIGS. 2 and 4C. The molecular entities can be regarded as molecular units, which, once assembled, form a network. The latter can typically be compared to a finite 2D crystal, whose crystal lattice will likely be imperfect, e.g., owing to vagaries in the synthesis and defects on the supporting surface 44s. More precisely, the present methods require modifying S22 the electrical conductance of molecular entities of a subset of the entities 24 of the network 26. Note, step S22 denotes a single tuning operation in the flowchart of FIG. 6, whereas S10, S20, and S30 denote different phases of a method according to specific embodiments, which are discussed later in detail.

Figure 3:
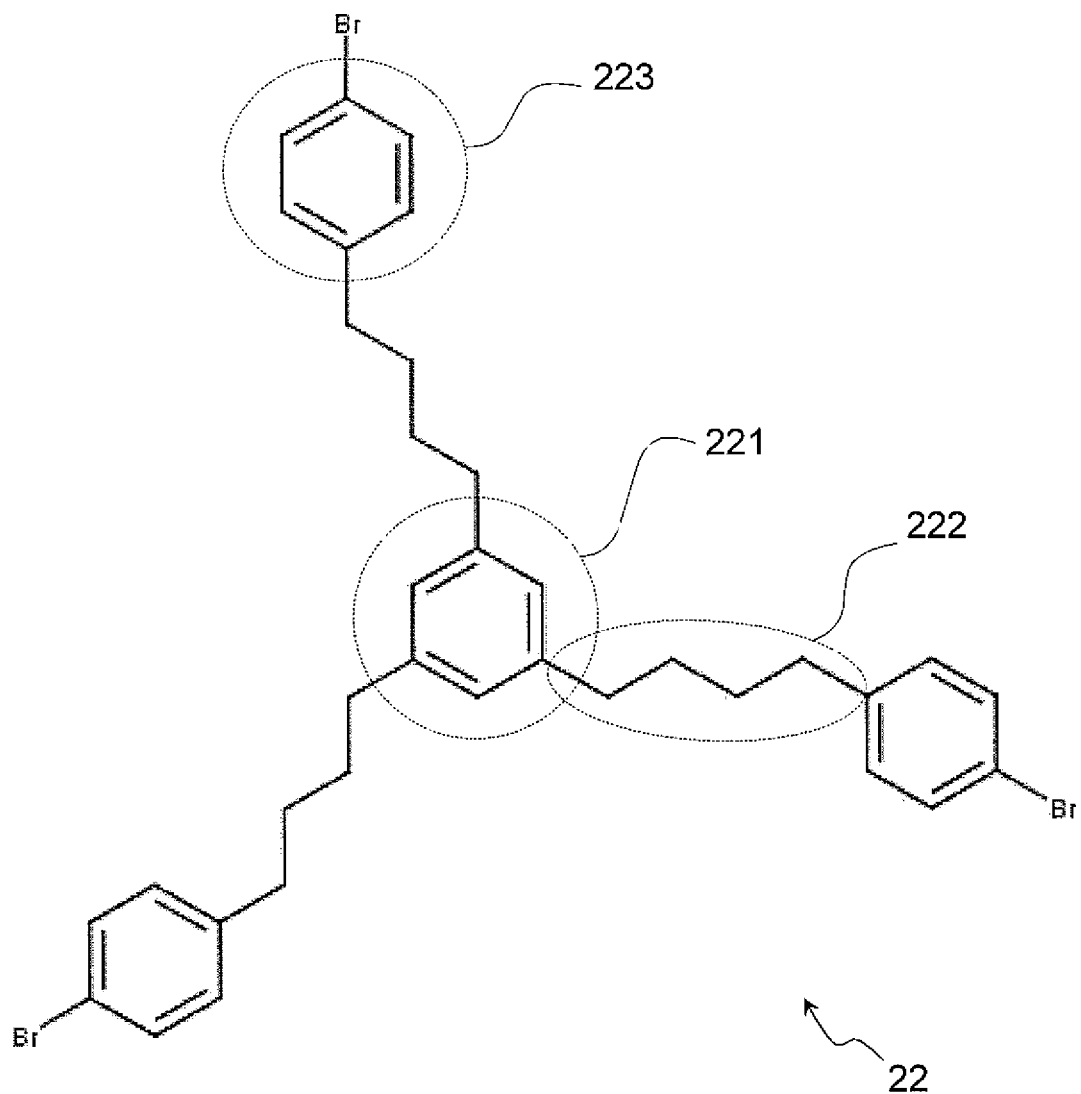
FIG. 3 shows a skeletal formula of molecules as successively involved in embodiments of the present method, and in particular, a preferred precursor molecule.

The molecular network 26 may notably be created by on-surface synthesis from precursor molecules 22 such as depicted in FIG. 3. In the molecular network 26 obtained, each molecular entity 24 comprises a branching junction 221, as well as M branches 222, where M≥3, and a corresponding number M of linkers 223. This is best seen in FIG. 3, showing a preferred precursor molecule, where a number of M=3 linkers is assumed, without loss of generality. Preferred precursors are described later in detail. The lower boundary (i.e., 3) to the above number M of linkers is required for the molecular entities to be able to connect and span a 2D space. In fact, the dimensionality of the space spanned by the molecular entities may be larger than one, in order to achieve the connectivity required in neural network applications discussed below. Thus, a 2D or quasi-2D configuration will typically be sought (the geometry of the network 26 will likely not be perfectly flat in practice), while linear chains of molecular entities are excluded. 3D assemblies of molecular entities can be contemplated too, wherein some molecular entities 24 branch (out-of-plane) from an otherwise flat configuration of the network 26.

As further seen in FIGS. 3-4, each of the branches 222 comprises an aliphatic group that branches from the branching junction 221. A linker 223 terminates a respective branch 222. Once the network 26 is formed, each linker of a molecular entity is covalently bonded to a linker 223 of another molecular entity of the network 26, as for instance seen in FIGS. 4A-4C.

For example, some or each of the aliphatic groups that form the branches 222 may comprise an acyclic alkyl group, i.e., a $(CH_2)_N$ chain, where N is larger than or equal to 1 (and typically strictly larger than 1, as assumed in the accompanying drawings). As such, the branches 222 may for instance be dehydrogenated, so to locally alter the conductance of a molecular entity 24, as in embodiments contemplated herein. Yet, several other mechanisms may be implemented to locally tune the conductance, as discussed later.

In variants or in addition to acyclic alkyl groups, the branches 222 may possibly include one or more aromatic rings. Likewise, the branching junction 221 and the linkers may possibly comprise, each, one or more aromatic rings, which can possibly be altered too. That is, any or each of the components (i.e., the branching junctions 221, the branches 222, and the M linkers) of some or each of the molecular entities 24 constituting the network 26 may possibly comprise one or more aromatic rings. Thus, only a subset of the molecular constituents 221-223 may possibly include aromatic rings.

In simple implementations, however, the network 26 is synthetized from same precursor molecules. For example, each branching junction 221 may comprise a first aromatic ring and each of the M linkers 223 may comprise a second aromatic ring, while the branches 222 consist of acyclic alkyl groups, as assumed in FIGS. 3-5. In such a case, the aromatic ring of a linker 223 is covalently bonded to the aromatic ring of a linker of another molecular entity 24 of the network 26, as illustrated in FIG. 4A. Further variants to the molecular structures can be contemplated, e.g., so as to provide molecular switches, as in embodiments discussed later. Using precursor molecules such as depicted in FIG. 3 will typically result in a molecular network that essentially has a 2D configuration, as illustrated in FIGS. 2 and 4C.

Figure 1A:
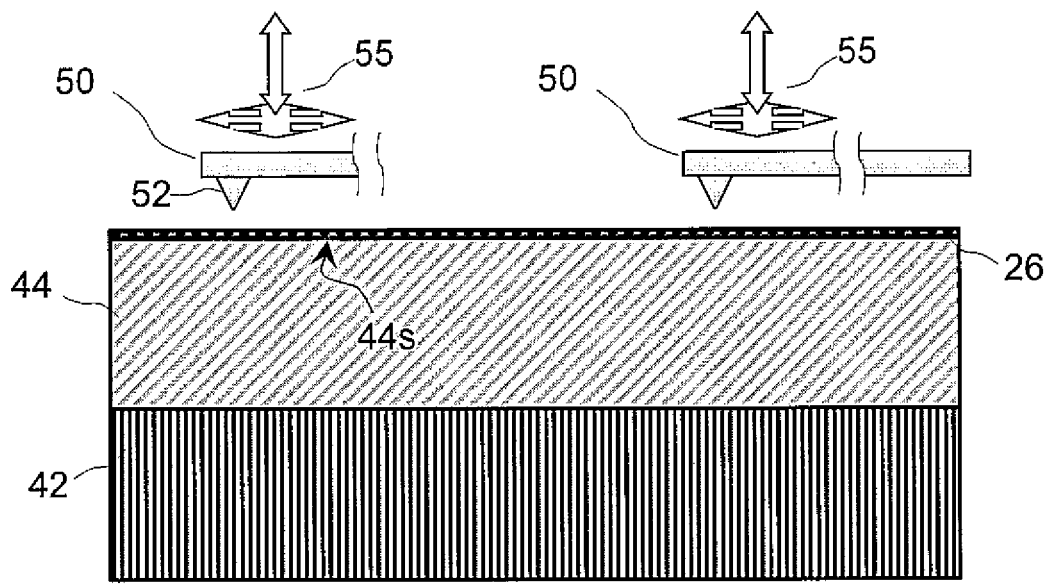
FIGS. 1A and 1B show 2D cross-sectional views of components of a processing apparatus according to embodiments.
Figure 1B:
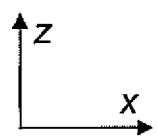
Figure 1B:
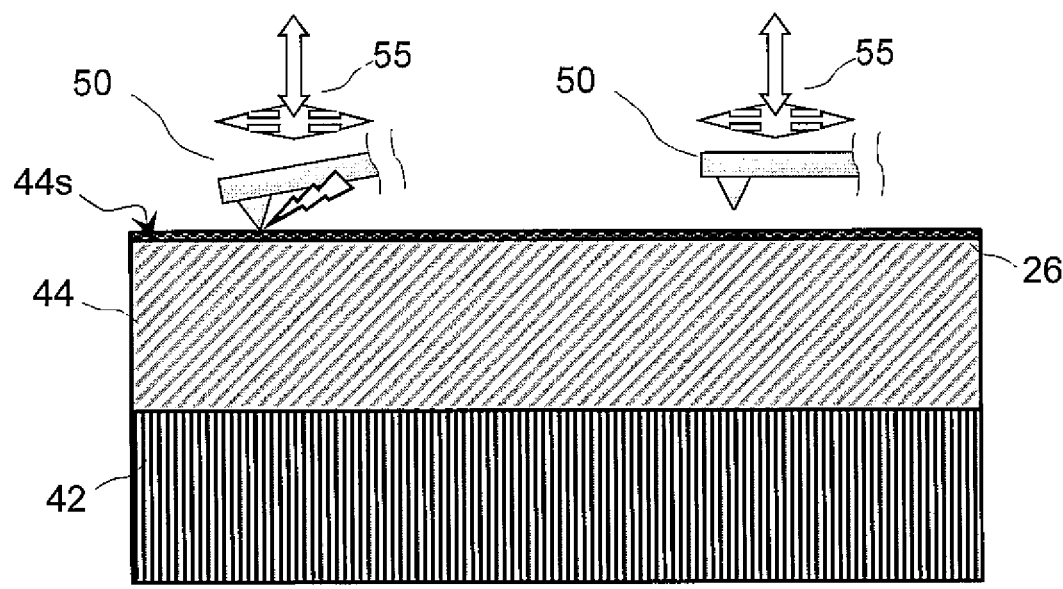
Figure 2:
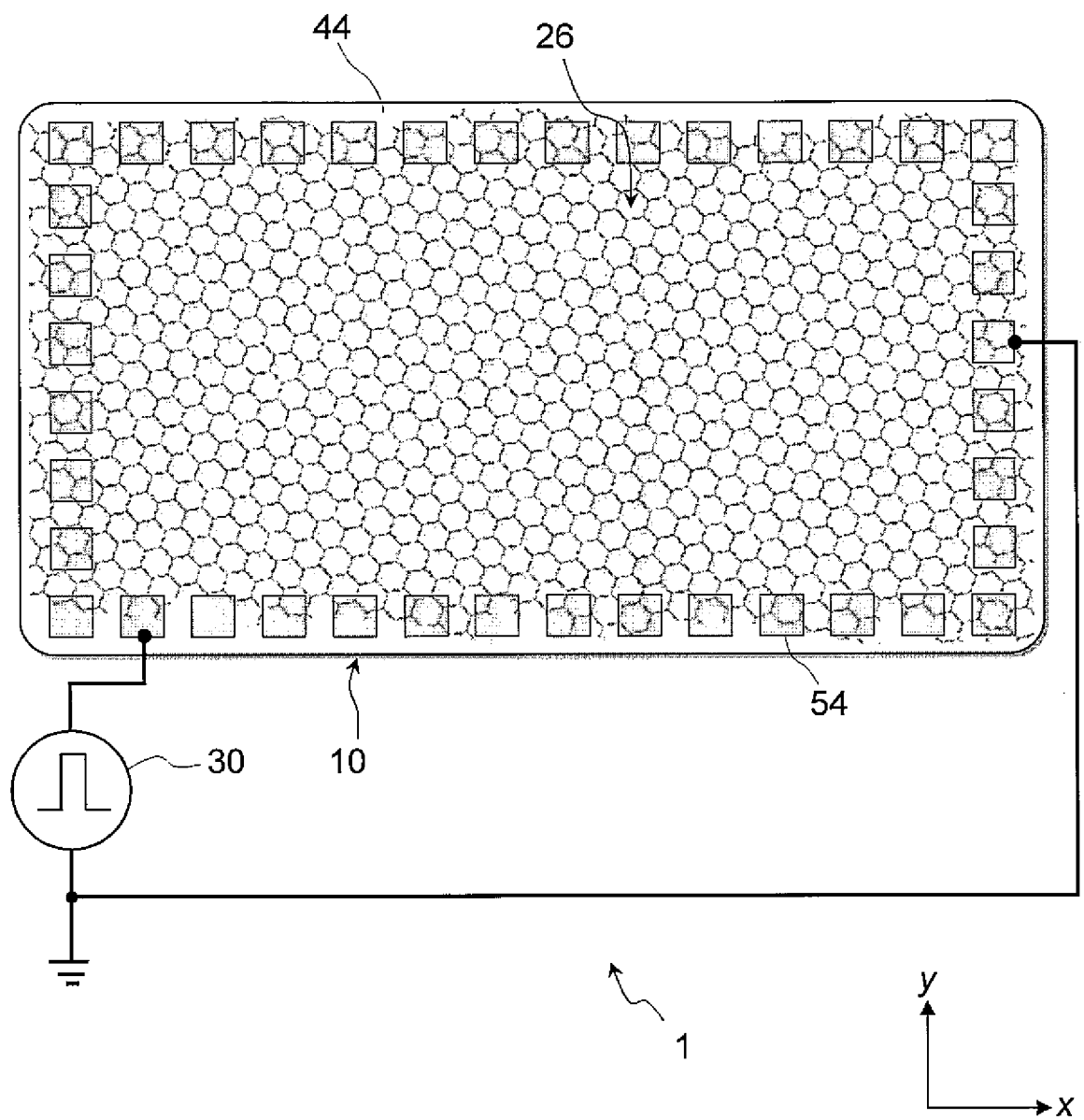
FIG. 2 is a top view of the components of the apparatus of FIG. 1.

The tuning S22 of the electrical conductance may for instance be performed using one or more nanoscale probes 50, as illustrated in FIGS. 1A and 1B. A nanoscale probe refers to a probe as used in scanning probe lithography (SPL) and/or atom manipulation techniques as discussed below. Using nanoscale probes allows a fine-grained tuning, at a near-atomic level. In variants or complementarily to nanoscale probes, other media may be involved, such as electrical contacts 54 or heating means, for example a laser (not shown). Such variants are easier to implement and make it possible to more quickly alter the local conductances of the molecular network 26. However, they are less "local" than nanoscale probes, inasmuch that entire portions (including several molecular entities 24) of the network 26 will be altogether impacted by the tuning S22. Yet, the overall size of the network 26 should nevertheless allow a large number of potential configurations, as needed in applications discussed herein.

Thus, the scale at which the electrical conductance of the network 26 is tuned S22 depends on the actual means 50, 54 used to write to the network 26. Only a subset of the molecular entities 24 are impacted, be it at each tuning step S22 or upon completion of all tuning steps S22. I.e., eventually, the electrical conductance of only a subset of the molecular entities 24 of the network 26 is altered, compared to the network as obtained after synthesis. Now, irrespective of the scale at which the network 26 is altered, it remains that the electrical conductance of the network 26 can be locally tuned (possibly down to individual molecular entities 24), which allows a very large number of potential alterations of the network.

Of particular advantage is the possibility to locally tune the electrical conductance of aliphatic branches 222. In particular, multiple conductivity values can be set by geometrical and/or chemical changes to the connecting molecular wires. More generally, molecular building blocks as used herein allow highly connected, two-dimensional networks of molecular wires, whose conductance and current can be tailored. For example, the electrical current may be locally adjusted S22 and then read S24, S34 as a function of an applied voltage, e.g., to measure local I-V characteristics of the network 26.

The versatility of the present tuning schemes notably allows the network 26 to be trained as a neural network hardware device. The molecular building blocks used herein make it possible to achieve a very dense network with plastic connections (network plasticity), and having low energy dissipation, especially when operated in the regime of single electron hopping. For instance, the areal footprint of one molecular entity 24 will typically range from 1 nm$^2$ to about 100 nm$^2$. Thus, a network may possibly include up to $10^{10}$ to $10^{12}$ molecular entities per mm$^2$. Of course, the size of the network may be adapted to the tuning means or media available. In addition, and as implicit from the present context, the network 26 is much preferably operated at extremely low temperatures (e.g., using liquid helium or nitrogen cooling, at temperatures on the order of 5 K or 77 K, respectively) and under sufficient vacuum conditions, (ultra-high vacuum, i.e., with base pressures on the order of $10^{-10}$ mbar or smaller).

All this is now described in detail, in reference to particular embodiments of the invention.

To start with, the electrical conductance of molecular entities 24 is preferably tuned S22 via a nanoscale probe 50. The system 1 may actually comprise a plurality of probes 50, e.g., possibly hundreds or thousands of such probes. The probes may possibly be independently controlled and actuated 55 in the system 1, to speed up the alteration process. Still, embodiments relying on only one or a few probe tips can be realistically contemplated, inasmuch as: (i) only a small fraction of the molecular entities may need be locally tuned, and (ii) the time required for a precise, local atom manipulation is on the order of one second or less, even for large arrays (see, e.g., Kalff, Nat. Nano 2016). Such manipulation times may incidentally be lowered to milliseconds.

Using nanoscale probes makes it possible to finely tune S22 the electrical conductance of molecular entities 24, on the lowest scale, e.g., by atom manipulations, by heating the probe, or by applying an electrical signal via the probe. A nanoscale probe 50 may notably be used to alter aliphatic groups of branches 222 of the entities 24. For example, atom manipulations based on an AFM or a STM setup may be used to locally distort the network 26 and/or induce chemical changes (e.g., dissociation of individual hydrogen atoms). Probes may also be used to switch reversible, single molecular switches such as charge switches (see, e.g., Gross, Science 2009 and Steurer, Nat. Comm. 2015), tautomerization switches (see, e.g., Liljeroth, Science 2007), conformational switches (see, e.g., Leoni, Phys. Rev. Lett. 2010), reversible cyclization switches (see, e.g., Schuler, Nat. Chem. 2016), or metal complexation switches (see, e.g., Mohn, Phys. Rev. Lett. 2010). As the one skilled in the art will appreciate, such molecular switches may indeed possibly be incorporated into molecular branches 222 and/or branching junctions 221 of the molecular entities 24.

In variants to the above atom manipulations, techniques derived from thermal scanning probe lithography (t-SPL) may be relied on, which use a heated probe 50 in order to locally induce a change in the conductance. In other variants, bias-induced SPL (b-SPL) techniques may be used to induce S22 the desired alterations. I.e., the electrical fields generated at the apex of a probe tip (when a voltage is applied between said tip and the molecular network 26) results in passing a current through one or more of the branches 222 of the molecular entities facing the tip. In still other variants, techniques derived from mechanical scanning probe lithography (m-SPL) or thermochemical scanning probe lithography (tc-SPL) can be used to locally manipulate the molecular network 26.

Note, m-SPL differs from atom manipulations such as manipulations based on an AFM or a STM setup. Indeed, in m-SPL techniques, a mechanical force is applied for lithographic purposes (e.g., by scratching over the surface), and is usually not performed with atom precision. In that respect, atom manipulation refers more to the precision (atomic) than the means to achieve the writing. Atom manipulations are typically achieved by way of mechanical interactions, electric fields, and by applying currents between a probe tip and the sample, or still by combining such techniques.

All such SPL/SPM techniques are known per se. As it can further be realized, such techniques may be used to trigger a variety of mechanisms, in order to locally change the electrical conductance of molecular entities 24 of the network 26. E.g., the geometry of the network 26 may possibly be changed by conformation, bending, or tilting. Other possible alteration schemes may include dehydrogenation or charge-state switching (oxidation/reduction), as evoked earlier. For example, some of the molecular entities 24 may be dehydrogenated, using an SPL-based, local oxidation (o-SPL) technique or based on tip-induced voltage pulses, as evoked earlier. This way, all carbon atoms of branch chains 222 of given molecular entities 24 may for example be changed from a sp$^3$- to a sp$^2$-hybridization state (compare FIGS. 5A and 5B). In variants, partly sp$^2$-hybridized segments may be obtained. More generally, the electrical conductance of molecular entities 24 can be tuned S22 by changing hybridization states of carbon atoms of the branches 222 of some of the molecular entities 24 of the network 26. In other variants, both partial and fully sp$^3$-hybridized segments may be obtained, with a distorted geometry (FIG. 5C). Owing to the variety of alterations that can potentially be achieved, one understands that the electrical conductance can be locally tuned S22 so as for single branches 222 within the molecular entities of the network 26 to have different electrical conductance values. Such a property can advantageously be leveraged to train hardware ANNs, as discussed later.

Figure 5A:
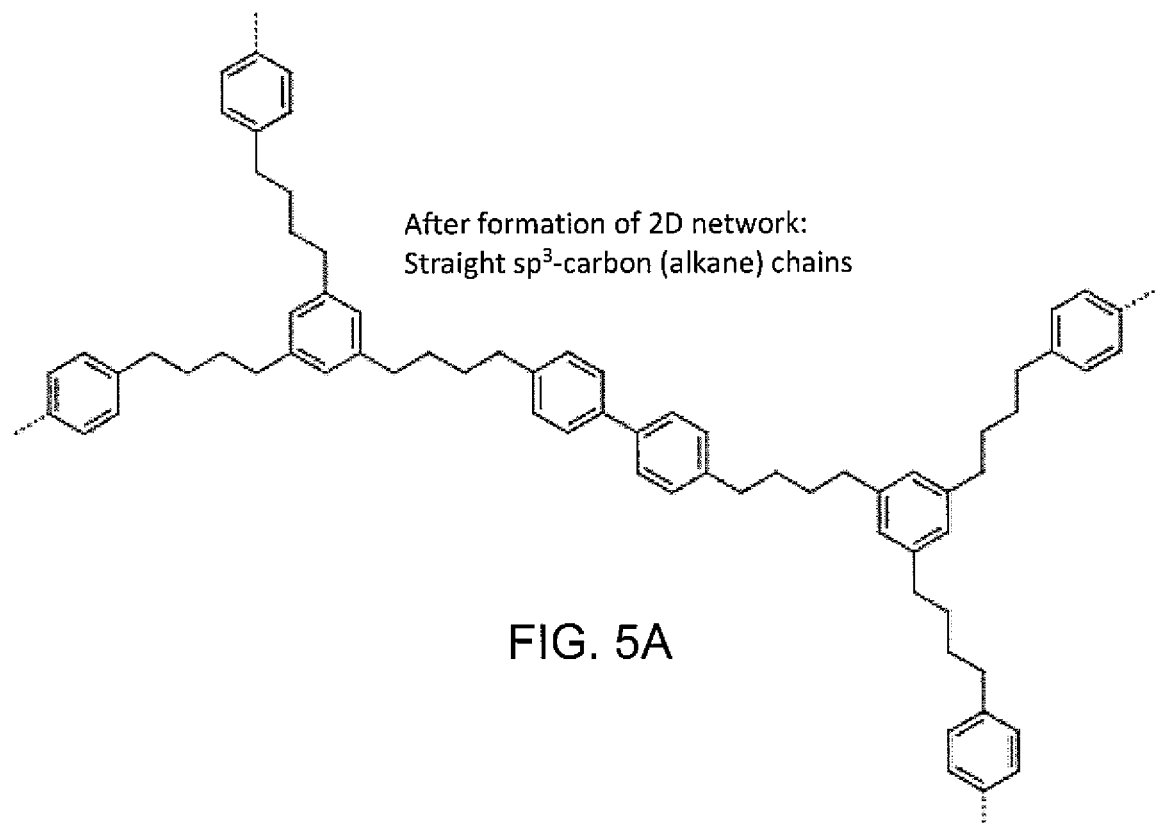
FIG. 5A depicts straight, $sp^3$-hybridized carbon (alkane) chains, as ideally obtained after formation of the network.
Figure 5B:
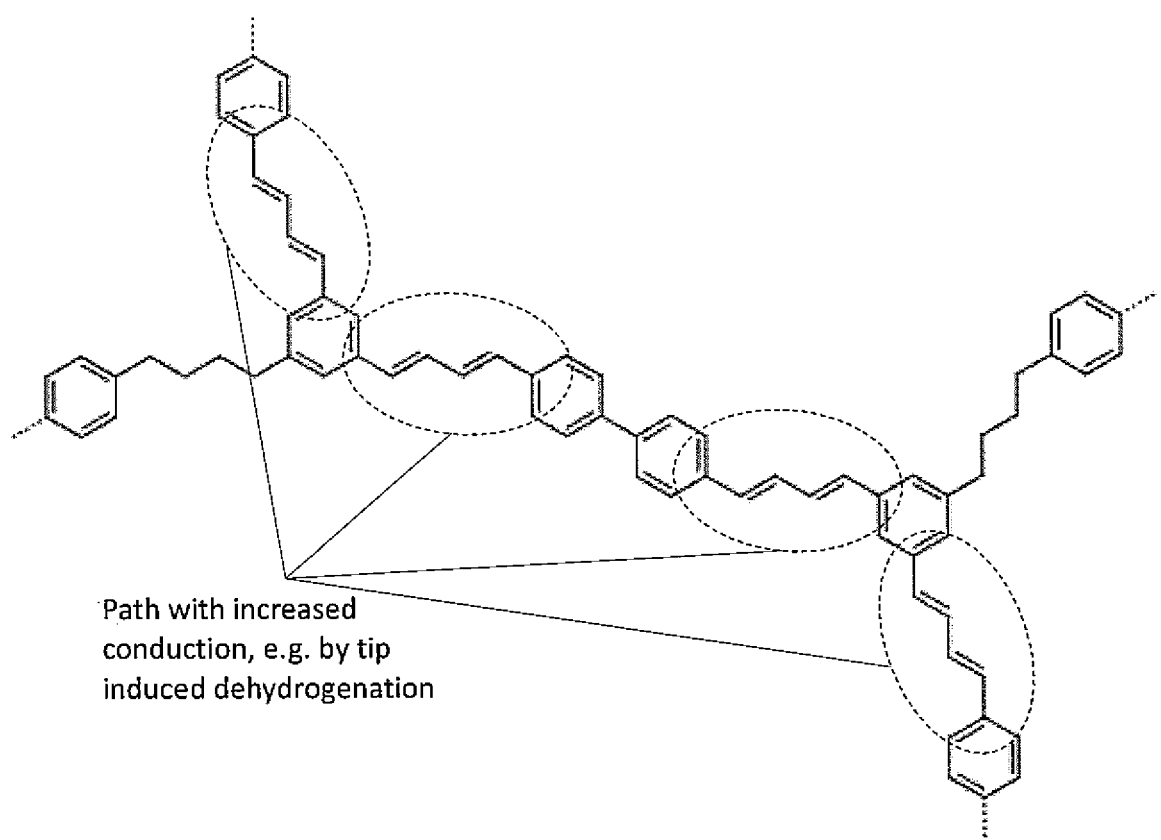
FIGS. 5B-5D illustrate various possible alterations (hybridization state, geometry distortion) to the carbon chains and/or linkers of the molecular entities, so as to locally modify the electrical conductance of the network, as in embodiments.
Figure 5C:
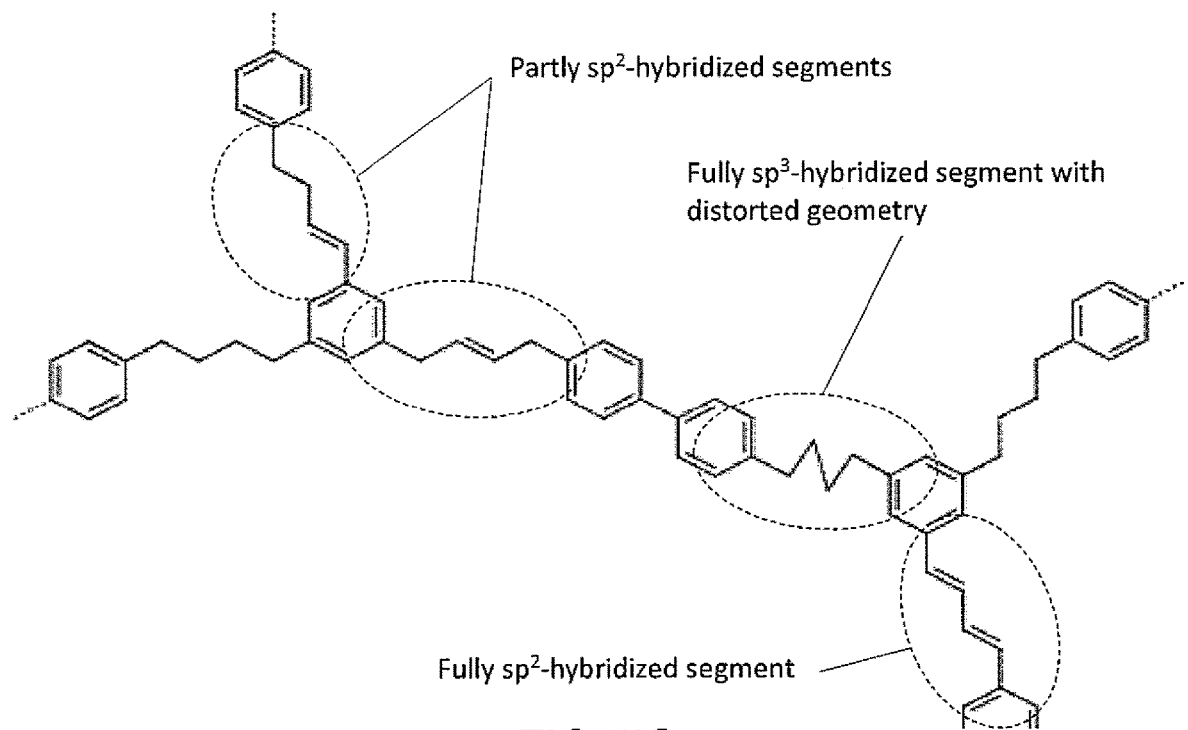

For example, one may start the alteration process based on molecular wires made of alkane chains, i.e., $(CH_2)_N$ carbon hydrogen chains comprising sp$^3$-hybridized carbons, as ideally obtained after on-surface synthesis, see FIG. 5A. That is, after the synthesis S10 of the network 26, the precursor molecules 22 form a covalently bound molecular network 26 such as shown in FIG. 4C. Now, after the network 26 has been formed, connections within the network 26 can be individually altered S22. For example, tip-induced dehydrogenation can be employed to increase the conductivity of the connecting molecular wires by transforming sp$^3$-hybridized $(CH_2)_N$ chains into higher-conductance, sp$^2$-hybridized $(CH_2)_N$ chains, as illustrated in FIG. 5B. In addition, chains may only be partly dehydrogenated, and/or the geometry be altered (see FIG. 5C), or, still, some of the chains may be completely broken (not shown).

Figure 5D:
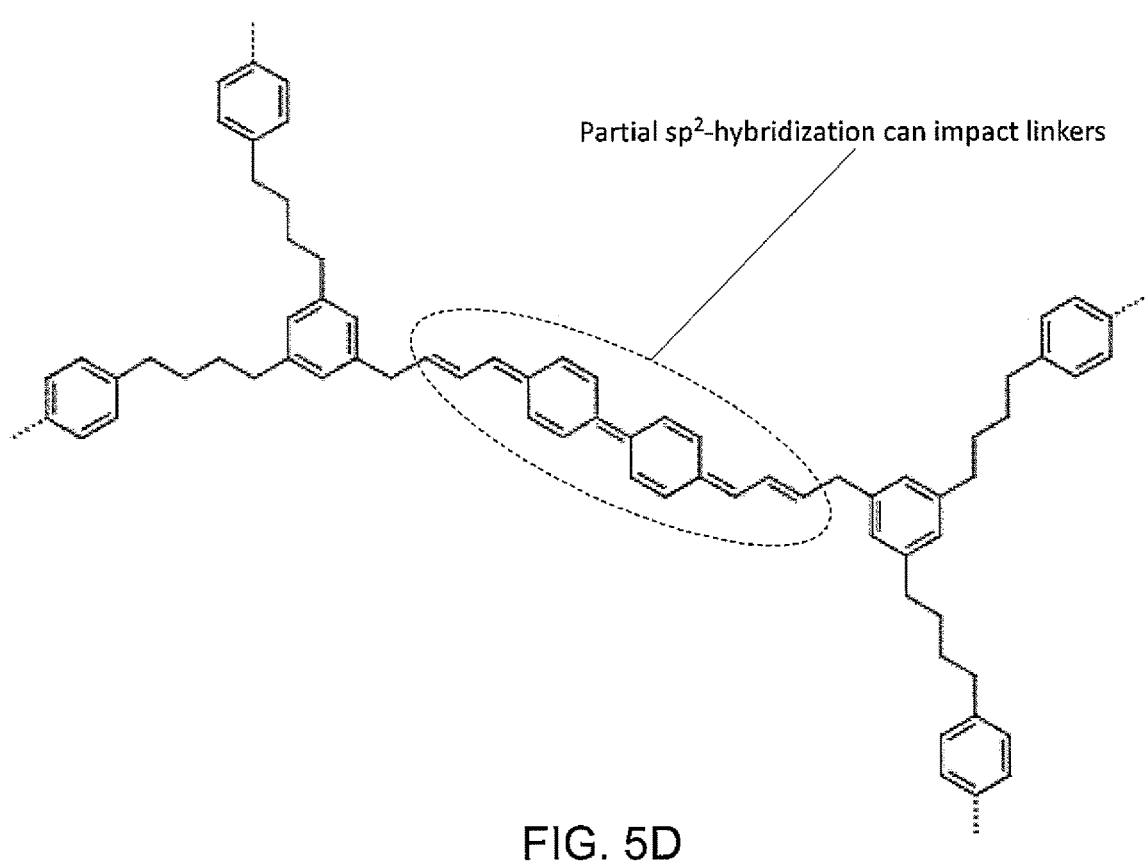

Moreover, partial sp$^2$-hybridization may possibly impact the linker groups, as illustrated in FIG. 5D. Such linkers may otherwise be independently manipulated too. Furthermore, local changes to the junctions 221, the branches 222, and/or the linkers may be induced due to other mechanisms, e.g., by incorporating molecular switches thereon and switch the latter between different charge states, as noted earlier.

Again, such changes can possibly be induced by atom manipulations or by locally applying a current to the network, e.g., via nanoscale probes. Incidentally, the temperature may possibly be raised to lower the barrier for chemical and/or geometrical changes. More generally, several SPL-like techniques may possibly be relied on. In addition, less "local" techniques may be contemplated, which make use of electrical contacts, lasers, etc. Atom manipulations will typically be preferred when seeking to achieve high resolution (possibly down to atomic precision). Altering the network 26 by atom manipulations will likely make it possible to achieve devices with the best power performance and the smallest footprint. One drawback of atom manipulation techniques, however, is that the writing is typically sequential and therefore slow. Still, atom manipulation techniques may possibly be adapted, to speed-up the tuning process. For example, large areas of the network may possibly be altered using a "large" electrical pulse from a tip, while only a small fraction of the branches may be subject to atomically precise manipulations.

In implementations that rely on single electron hopping through the network, a defined number of electrons can be attached/detached by applying defined voltage biases. For read-out purposes S24, S34, the number of electron charges can be measured at outputs of the network. This can notably be achieved with single-electron transistors, or using electrostatic AFM, or, still, Kelvin probe force microscopy (see, e.g., Gross, Science 2009 and Steurer, Nat. Comm. 2015).

Figure 6:
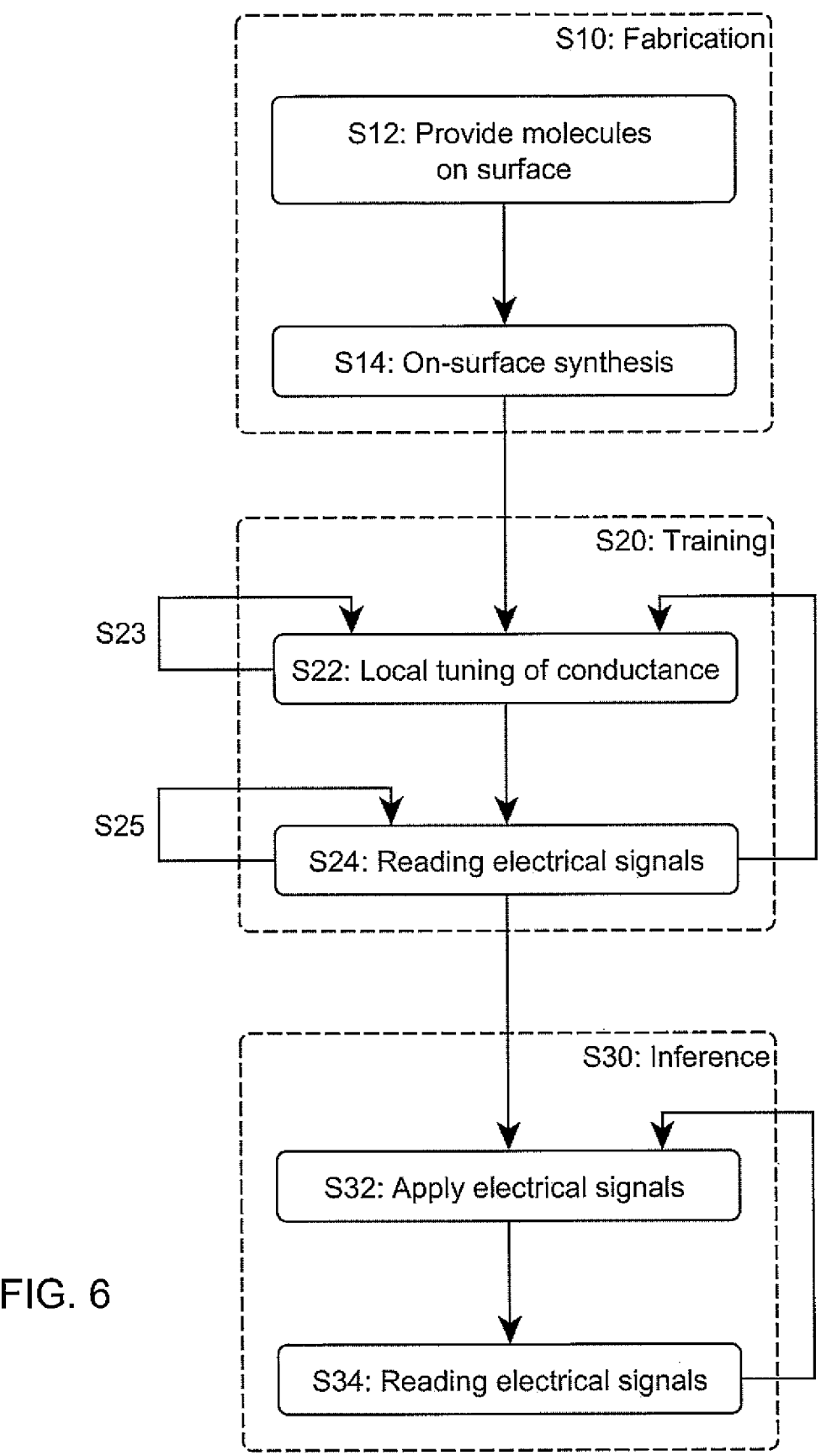
FIG. 6 is a flowchart illustrating high-level steps of a method for synthetizing a molecular network, locally tuning the conductance of this network, and thereby train this network for subsequent inferences, according to embodiments.

So far, the discussion essentially focused on how the network can be locally altered, which corresponds to phase S20 in the flowchart of FIG. 6. At present, preferred methods to obtain the present devices are discussed in reference to FIGS. 3, 4, and 6. As evoked earlier, the molecular network 26 is preferably synthetized S14 by on-surface chemistry. A 2D network 26 as shown in FIG. 4C can for instance be grown using on-surface synthesis, by thermal annealing of precursor molecules 22. In particular, the on-surface synthesis may rely on coupling reactions, such as the so-called Glaser or Ullmann coupling reactions.

For example, and as illustrated in FIG. 3, the synthesis may first require S10 to provide S12 precursor molecules 22 having a geometry close to that of the molecular entities 24. I.e., each precursor molecules may for instance include a branching junction 221 (with a first aromatic ring), M branches 222 (each branching from the branching junction 221, M≥3), where each branch 222 comprises an acyclic alkyl group, and M linkers 223, each terminating a respective branch 222 and comprising a second aromatic ring. As seen in FIG. 3, the second aromatic ring may for example be covalently bound, on the one hand, to a respective branch 222, and, on the other hand, to a halogen atom X, see FIG. 3. Then, the network 26 can be synthetized S14 by forming S14 bonds between linkers 223 of pairs of the molecules 22, by dehalogenation, as successively illustrated in FIGS. 4A, 4B, and 4C. In variants, the linkers may possibly comprise alkyne groups (instead of being bound to halogen atoms), and such linkers can subsequently be dehydrogenated for Glaser coupling. Note, however, that both mechanisms (dehalogenation and dehydrogenation) are compatible with Glaser coupling reactions (i.e., Glaser coupling also works with a terminal hydrogen atom).

Upon dehalogenation or dehydrogenation, precursor molecules 22 bond to each other, whereby the aromatic ring of a linker gets covalently bonded to an aromatic ring of a linker of another molecule 22, see FIG. 4A. This way, links are formed between molecules 22, so as to form molecular entities 24 of the network 26, see FIG. 4B. Such bonds may for instance be formed after debromination, by on-surface synthesis, as assumed in FIGS. 3-4C. Again, Ullmann or Glaser coupling reactions can be involved, which are known per se.

For example, where Ullman coupling reactions are intended, halogenated precursor molecules 22 can be evaporated onto a surface 44s of the device (see FIGS. 1-2). Variants relying on Glaser coupling may instead use molecules featuring alkyne groups terminating their linkers. Then, this surface 44s is annealed to induce dehalogenation or dehydrogenation, covalent coupling, and possibly partial dehydrogenation and planarization. Note, longer alkane chains are usually not straight on the surface 44s after deposition due to their flexibility. This would anyway make them likely unsuitable for growing a 2D network. However, when reaching a temperature that is close to or below the temperature needed to induce the on-surface coupling reactions, the wire/chain parts straighten up due to thermal annealing and thus enable formation of ordered networks (Schuler Chem. Sci. 2017).

Research efforts on covalently bound molecular networks obtained by on-surface synthesis currently focus on trying to grow perfect, defect-free and homogenous networks. On the contrary, the present approach does not require a perfect network to be achieved. Rather, a molecular network 26 is first created which may already include defects, and then atom manipulations (and/or other techniques as discussed earlier) are used to further alter the network 26, thus inducing more defects in the network. Such defects can for example be compared to ink deposited on a non-perfect sheet of paper.

As further assumed in FIGS. 3-4, the network 26 may for instance be grown by debromination of the precursor molecules 22. I.e., the halogen atom X can notably be a bromine atom (Br), in which case bonds between the linkers 223 of pairs of the molecules 22 are formed S14 by debromination. In variants, other halogen-terminated precursors 22 may be used, such as including iodine (I) or chlorine (Cl), for example, or, still, the linkers may possibly be terminated with alkyne groups, which will be dehydrogenated for coupling, as noted earlier.

After formation of a (quasi) 2D molecular network 26 such as shown in FIG. 4C, the branches 222 of the individual entities 24 may ideally consist of straight $sp^3$-carbon (alkane) chains, see FIG. 5A, whose electrical conductance can subsequently be tuned S22 (e.g. by tip-induced dehydrogenation), to obtain paths with increased conduction, as described earlier.

Note, the network 26 may first be synthetized on a given surface (e.g., having most suitable properties for synthesis purposes) and then transferred to another surface 44s, e.g., having properties more suited for tuning S22 and/or reading S24, S34 purposes. Still, the molecular network 26 may possibly be transferred after tuning. This point is further discussed later.

In particularly preferred applications, the molecular network 26 is meant to embody an artificial neural network (ANN). I.e., the present methods can be used to train S20 such an ANN, e.g., with respect of a set of feature vectors. That is, the local electrical conductances or resistances can be interpreted in terms of numerical values corresponding to trainable weights of an ANN, as implemented by the molecular network 26. The local electrical conductances can thus be modified S22 in order to correspondingly modify weight values for the ANN and thereby train the latter. The process and context are comparable to those used in other hardware implementations of ANNs (e.g., resistive processing entities and other trainable resistive crosspoint devices), except that the scale of the underlying device 1, 26 and the processes used to alter the local conductances markedly differ.

For example, electrical conductances can be locally modified S22 (e.g., at the level of single branches 222), so as for signals obtained S24 in outputs of the network to reproduce desired values, as in supervised learning schemes. Note, the training phase S20 will likely involve multiple, successive tuning steps S22, S23 performed at different locations on the network 26, e.g., by moving and actuating probe tips 50.

Multiple read-out steps S24, S25 may possibly need be intertwined, as suggested in the flowchart of FIG. 6, in order to control the writing process, step-by-step. The one skilled in the art will appreciate that various schemes can be envisioned to incrementally adjust the local conductances (and thus currents) of the network 26, and thereby refine trainable weights of the ANN system 1. In typical implementations, however, high-conductance (low-resistance) values will correspond to dominant-contributions of such branches 222 and related branching entities 221 in the current paths and thus to larger weights in such paths.

Neuromorphic processing can advantageously benefit from novel devices as described herein. Beneficial capabilities for such applications notably reside in the low-power dissipation, reduced dimensions, and the high degree of connectivity enabled by the network 26. I.e., a large number of tunable parameters can be enabled for connectivity, whereby the conductivity of a very large number of individual connections can be changed to achieve plasticity of the network 26.

The third and last phase S30 of the flowchart of FIG. 6 concerns the actual use of the network 26, once trained S20. I.e., after synthesis S10 and a suitable training S20, the network 26 can be used S30 for inference purposes. That is, upon completion of phase S20, the molecular network 26 can be regarded as storing information through, e.g., altered conformations, configurations and/or otherwise altered conductances of the branches 222. Such information can thus be used to perform usual ANN-like operations, i.e., predictions or classifications.

Typical embodiments may for instance involve reading S34 characteristics of currents and/or voltage biases applied S32 to the trained network 26 (e.g., based on feature vectors distinct from those used during the training S20), so as to read the response of the trained S20 network to new inputs. Preferably, the readout is achieved by reading S34 characteristics of a current signal applied via inputs and outputs S32 of the network. Again, this may involve nanoscale probes 50 (positioned in sufficient proximity with the network 26) and/or electrical contacts 54.

In that respect, another example aspect is now described, which concerns an information processing apparatus 1.

As illustrated in FIGS. 1 and 2, the apparatus includes a support 42, 44, which may for example include a layer stack 42, 44, including a thicker layer 42 that provides mechanical stability to the support, and an upper layer 44, exposing a suitable surface 44s to attach the network 26. The device further comprises a network 26 of covalently bound molecular entities 24, where the network is arranged (extends) on the support 42, 44, e.g., on a top surface 44s thereof. The network 26 includes molecular entities 24 as described earlier. I.e., the entities 24 comprise, each, a branching junction 221, M branches 222 branching from a branching junction 221 (M≥3), where each of the M branches 222 comprises an aliphatic group, and M linkers 223, each terminating a respective branch 222. As already explained, each of the M linkers is covalently bonded to a linker 223 of another molecular entities 24 of the network 26. The network 26 may for instance have been obtained by on-surface chemistry techniques such as described earlier.

The apparatus 1 further comprises a tuning system 30-55. The latter includes one or more contacting elements 50, 52, 54. Such elements are configured in the tuning system so as to contact molecular entities 24 of the network, in operation. This way, the tuning system can be used to tune the electrical conductance of molecular entities 24 of a subset of the molecular entities of the network 26, consistently with the methods described earlier.

In preferred embodiments as illustrated in FIGS. 1-2, the contacting elements comprise or consist of one or more nano scale probes 50. In that case, the tuning system 42-55 further includes a motion system 55 designed to move the probes 50 and actuate the latter, as necessary to locally tune the electrical conductance of the network 26, in operation. This is illustrated in FIGS. 1A and 1B, where two nanoscale probes 50 are scanned 55 over a 2D network 26 and further pivoted (bent or otherwise moved along the vertical axis z), after having reached a given position in the (x, y), above the 2D network 26, to locally change the conductance of molecular entities 24 of the network 26. As explained earlier, various other actuation mechanisms may actually be contemplated, including tip-induced voltage biases or heating, for example.

Moreover, the apparatus 1 may further be configured to read characteristics of a current and/or a voltage bias applied to the molecular network 26, as in preferred embodiments. For example, local I-V characteristics of the network 26 may need be measured for readout purposes. As also evoked earlier, in a scaled version relying on single-electron hopping, the apparatus may be designed to allow a number of electrons to be measured at outputs of the network. The apparatus 1 may notably be configured to read characteristics of a current and/or voltage bias via nanoscale probes 50 and/or dedicated electrical contacts 54.

Indeed, as depicted in FIG. 2, the apparatus 1 may possibly include a set of electrical contacts 54 arranged on a surface 44s of the support 42, i.e., the surface 44s onto which the network 26 extends. Each contact 54 may for instance be made level (flush) with surrounding regions of the surface 44s, so as to contact molecular entities 24 of the molecular network 26 in regions defined by the apparent surfaces of the contacts 54. This way, electrical signals may be applied to the network 26, via the contacts 54. If necessary, electrical signals may be applied, on the one hand, via the contacts 54 and, on the other hand, via nanoscale probe tips brought in proximity with the network 26.

As further seen in FIG. 2, electrical contacts 54 are preferably arranged at a periphery of the support surface 44s, so as to contact edge molecular entities 24 of the molecular network 26 at the periphery. This way, electrical signals may be applied to inputs/outputs of the network 26, via the contacts 54, as for instance needed for readout purposes S34. And beyond the peripheral contacts 54 shown in FIG. 2, additional contacts (not shown) may further be distributed across the supporting surface 44s of the support, e.g., to form a 2D array of contacts. Note, such contacts may play the role of heating elements. In all cases, the conductance of the network 26 may be tuned, locally, using inner contacts, possibly together with probe tips. Meanwhile, the peripheral contacts 54 may be used to read electrical currents passed from one edge of the network 26 to the other, as assumed in FIG. 2. Note, in FIG. 2, a controller 30 is schematically depicted as being connected to a single pair of contacts 54, for conciseness. However, this controller 30 will actually be connected to each electrical contact, so as to apply an electrical signal between any pair or at least a portion of the pairs of contacts, as in matrix addressing schemes.

As noted earlier, the size of the molecular entities may possibly be on the order of 10 nm, which comes into reach of various state-of-the-art lithography techniques. Thus, a close mapping may possibly be achieved between electrical contacts and molecular entities. In more likely variants, however, the apparent surface of each contact 54 will likely be larger than a single molecular entity 24. Yet, the exposed area of the contacts 54 shall typically be small in comparison of the overall area of the network 26, such that the conductance of local portions of the network can still be tuned via such contacts. The same contacts 54 can then be used to read S24, S34 electrical signals applied to the network 26, be it during the training stage S20 (writing) or the inference stage S30 (reading).

Contacts 54 to the molecular network are preferably fabricated using nanostencil lithography, as the latter is compatible with ultrahigh vacuum environment and molecular thin films (see Gross, J. Vac. Sci. Technol. B, 2010). Other possible fabrication methods of the electronic contacts comprise e-beam lithography, and optical, ultraviolet (UV), or extreme ultraviolet (EUV) lithography. Such techniques would normally be used to fabricate the electrical contacts prior to fabricating the molecular network.

In other embodiments, the present devices may include one or more laser devices (not shown), adequately orientable with respect to the surface 44s to locally heat the latter.

The exposed surface of the support 42, 44 may possibly be an insulating surface 44s. In variants, this surface could be semiconducting or, still, electrically conducting (e.g., a noble metal surface), as normally preferred for on-surface synthesis reactions. However, in the latter case, the local conductances can normally not be locally altered by applying electrical signals, because of the short-circuiting by the conductive surface 44s. Rather, where, e.g., tip-induced voltage biases need be applied, a covalent linking of dehalogenated or dehydrogenated precursor molecules 22 shall preferably be achieved on an insulating surface. Alternatively, covalently bound networks may possibly be initially grown on metal substrates and then transferred onto an insulating or a semiconducting substrate. For completeness, we note that the transfer of the molecular network 26 may be performed prior to or after tuning of the conductance, irrespective of the method used for altering the conductance.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method for tuning the conductance of a molecular network, the method comprising:
   providing a network of covalently bound molecular entities, wherein each of the molecular entities comprises:
   a branching junction;
   M branches branching from said branching junction, M≥3, each of the M branches comprising an aliphatic group; and
   M linkers, each terminating a respective one of the M branches, and wherein each of the M linkers is covalently bound to one of the linkers of another one of the molecular entities of the network, and
   tuning the electrical conductance of molecular entities of a subset of the molecular entities of the network;
   wherein the electrical conductance of said molecular entities is tuned via a nanoscale probe.

2. The method according to claim 1, wherein, for each of the molecular entities,
   one or each of said branching junction, said branches, and said each of the M linkers comprises one or more aromatic rings.

3. The method according to claim 2, wherein, for each of the molecular entities,
   said branching junction comprises a first aromatic ring and each of the M linkers comprises a second aromatic ring, the latter covalently bound to an aromatic ring of one of the linkers of another molecular entity of the network.

4. The method according to claim 3, wherein
providing the network comprises synthetizing the network by on-surface chemistry.

5. The method according to claim 4, wherein
providing the network comprises:
   providing molecules, each comprising:
      a branching junction with a first aromatic ring;
      M branches branching from said branching junction, M≥3, each of the M branches comprising an acyclic alkyl group; and
      M linkers, each terminating a respective one of the M branches and comprising a second aromatic ring covalently bound, on the one hand, to said respective one of the M branches, and, on the other hand, to a halogen atom X, and
   synthetizing the network comprises forming bonds between linkers of pairs of the molecules provided by dehalogenation.

6. The method according to claim 4, wherein
the network is synthetized by on-surface chemistry on a first surface, and
providing the network further comprises, after synthetizing the network, transferring the molecular network from said first surface to a second surface.

7. The method according to claim 1, wherein
the electrical conductance of said molecular entities is tuned by one or more of: atom manipulations; heating; and passing a current through corresponding branches of the molecular entities, each via said nanoscale probe.

8. The method according to claim 1, wherein
the electrical conductance of said molecular entities is tuned so as for molecular entities of said subset to have different electrical conductances.

9. The method according to claim 1, wherein
the electrical conductance of at least some of the molecular entities is tuned by changing hybridization states of carbon atoms of branches of said at least some of the molecular entities.

10. The method according to claim 1, wherein
the electrical conductance of said molecular entities is tuned so as to train the molecular network with respect of a set of feature vectors.

11. The method according to claim 10, wherein
said set of feature vectors is a first set, and the method further comprises reading characteristics of currents and/or voltage biases applied to the trained network, wherein said currents and/or voltage biases applied are generated based on a second set of feature vectors, for inference purposes.

12. An information processing apparatus, comprising:

a support;

a network of covalently bound molecular entities, arranged on the support, wherein each of the molecular entities comprises:

a branching junction;

M branches branching from said branching junction, M≥3, each of the M branches comprising an aliphatic group; and M linkers, each terminating a respective one of the M branches, wherein each of the M linkers is covalently bound to one of the linkers of another one of the molecular entities of the network, and a tuning system comprising one or more contacting elements, the latter configured in the tuning system so as to contact molecular entities of the network, for the tuning system to tune the electrical conductance of molecular entities of a subset of the molecular entities of the network, in operation;

wherein the one or more contacting elements comprise one or more nanoscale probes and the tuning system further comprises a motion system to move the one or more nanoscale probes and thereby tune the electrical conductance of said molecular entities, in operation.

13. The information processing apparatus according to claim 12, wherein the information processing apparatus is further configured to read characteristics of a current and/or a voltage bias applied to the molecular network.

14. The information processing apparatus according to claim 13, wherein the apparatus is configured to read characteristics of said current and/or voltage bias via the one or more nanoscale probes.

15. The information processing apparatus according to claim 12, wherein said support comprises a set of electrical contacts arranged on a surface of the support, onto which the network of covalently bound molecular entities extends, each of the contacts contacting one or more of the molecular entities of the molecular network.

16. The information processing apparatus according to claim 15, wherein said electrical contacts are arranged at a periphery of the support, so as to contact edge molecular entities of the molecular network.

17. The information processing apparatus according to claim 12, wherein said support comprises an insulating surface.

18. A method for tuning the conductance of a molecular network, the method comprising:

providing a network of covalently bound molecular entities, wherein each of the molecular entities comprises:

a branching junction;

M branches branching from said branching junction, M≥3, each of the M branches comprising an aliphatic group; and M linkers, each terminating a respective one of the M branches, and wherein each of the M linkers is covalently bound to one of the linkers of another one of the molecular entities of the network, and tuning the electrical conductance of molecular entities of a subset of the molecular entities of the network;

wherein the electrical conductance of said molecular entities is tuned so as to train the molecular network with respect of a set of feature vectors.

19. The method according to claim 18, wherein said set of feature vectors is a first set, and the method further comprises reading characteristics of currents and/or voltage biases applied to the trained network, wherein said currents and/or voltage biases applied are generated based on a second set of feature vectors, for inference purposes.

* * * * *